United States Patent [19]

Nishino

[11] Patent Number: 4,804,229

[45] Date of Patent: Feb. 14, 1989

[54] SEAT SLIDE DEVICE

[75] Inventor: Takaichi Nishino, Akishima, Japan

[73] Assignee: Tachi-S Co., Ltd., Tokyo, Japan

[21] Appl. No.: 61,534

[22] Filed: Jun. 11, 1987

[51] Int. Cl.⁴ .............................................. A62B 35/60
[52] U.S. Cl. .................................... 297/471; 248/430; 280/804; 280/805; 297/216; 297/473
[58] Field of Search ............... 297/473, 470, 471, 472, 297/468, 216; 248/429, 430; 280/804, 805

[56] References Cited

U.S. PATENT DOCUMENTS

| 3,524,677 | 8/1970 | Louton, Jr. .......................... 297/216 |
| 3,746,393 | 7/1973 | Andres et al. ........................ 297/468 |
| 4,225,184 | 9/1980 | Strowick ............................... 297/468 |
| 4,248,480 | 2/1981 | Koucky et al. ................... 297/468 X |

FOREIGN PATENT DOCUMENTS

| 2014007 | 10/1971 | Fed. Rep. of Germany ...... 297/468 |
| 2136107 | 2/1973 | Fed. Rep. of Germany ...... 280/805 |
| 2400898 | 7/1975 | Fed. Rep. of Germany ...... 297/468 |
| 2742668 | 3/1979 | Fed. Rep. of Germany ...... 297/470 |
| 2820589 | 11/1979 | Fed. Rep. of Germany ...... 297/473 |

Primary Examiner—Peter A. Aschenbrenner
Assistant Examiner—Thomas A. Rendos
Attorney, Agent, or Firm—Oldham & Oldham Co.

[57] ABSTRACT

A seat slide device for adjusting the forward and backward positions of the seat which comprises an upper rail and a lower rail, the upper rail being slidably fitted to the lower rail. In the upper rail, there is provided an anchor plate adapted to be connected with a seat belt, the anchor plate having a plurality of hook members arranged in correspondence with a plurality of engagement holes formed in the lower rail. When an upward pulling force is exerted on the anchor plate, the hook members are brought to engagement into the engagement holes, to thereby prevent removal of the upper rail from the lower rail.

8 Claims, 2 Drawing Sheets

PRIOR ART    PRIOR ART

SEAT SLIDE DEVICE

BACKGROUND OF THE INVENTION

1. Field of the Invention

The present invention relates to a seat slide device for an automotive seat, which is adapted to adjust the forward and backward positions of the seat, and more particularly relates to an improvement on a seat slide device comprising upper and lower rails, the upper rail being slidably fitted to the lower one, in which a seat belt is at its one end anchored to the upper rail or a seat frame of the seat, in order that the upper rail is prevented from its removal out of the lower rail.

2. Description of the Prior Art

Most of generally designed seat slide devices are essentially composed of a lower rail to be fixed to the floor of an automobile and an upper rail to be fixed to the bottom surface of a seat, with such an arrangement that the upper rail is fitted to the lower rail in a slidable fashion. In actual use, a pair of thus-constructed slide devices are each provided on the respective lateral sides of a seat.

Referring to FIG. 1 of the accompanying drawings, illustrated is an example of conventional seat slide device of this kind. In this particular device, a roller (50) is disposed between a lower rail (112) and an upper rail (114), and a steel ball (122) is embraced by both inwardly bent end (128) of the upper rail (114) and outwardly bend end (124) of the lower rail (112). It is, then, understandable that a vertical force is exerted on the roller (50) whereas vertical and transverse forces are exerted on the steel ball 122).

The advantage of such prior, therefore, is found in no possibility of the upper rail (114) being dislocated vertically or laterally relative to the lower rail (112), allowing the former rail to smoothly slide along the latter rail.

Although not shown in the drawings, a locking structure is in most cases arranged in the foregoing seat slide device, such that a plurality of equidistant projected pieces are formed on the upper rail (114) and a plurality of lock apertures are formed in the lower rail (112) in correspondece with the respective projected pieces, whereby the upper rail (114) can be locked at a desired position on the lower rail (112) when the projected pieces are brought to engagement into the respective lock apertures.

In the above-mentioned device per se, there is no problem in the case of a sudden accident like a collision taking place, with a great load applied thereto. This is particularly the case when a seat belt is not attached around the body of an occupant on the seat. The reason is that, in such accident, the upper and lower rails (114)(112) are given a maximum load only when the occupant is forced backwards to hit his body to the seat back of his seat provided on those rails, at which time, due to such load upon the seat back, an upward pulling force is exerted on the forward point where the forward end portion of the seat is connected to the corresponding portion of the upper rail (114) while at the same time a downward pressing force is exerted on the rearward point where the rearward end portion of the seat is connected to the corresponding portion of the upper rail (114), but the former pulling force (designated by "F" in FIGS. 1 and 2), although tending to remove away the forward end portion of the upper rail (114) from the lower rail (112) in an arrow direction as in FIG. 1, is not so sufficiently great as to remove the upper rail (114). Therefore, the seat slide device is not damaged in such case.

However, in view of the recent circumstances where attaching a seat belt is a mandatory legal requirement for drivers who sit on automotive seats, it is true that every automobile has seat belts mounted therein, and when it is desired to secure one end of the seat belt to the seat frame of the seat or the upper rail of the seat slide device, the aforementioned type of conventional seat slide device is not rigid enough to resist such upward pulling force caused by a collision accident or the like.

In other words, when a seat belt is fixed to the upper rail (114) or the seat frame disposed thereon, in case of a collision accident occuring, the seat belt, which restrains an occupant to the seat, is pulled by the forward inertia force of the occupant, transmitting a maximum pulling force to the seat slide device. In this case, a downward pressing force is exerted on the above-discussed forward point (a point where the forward end portion of the seat is connected with the upper rail (114)), and an upward pulling force is exerted on the above-discussed rearward point (a point where the rearward end portion of the seat is connected with the upper rail (114)). The latter upward pulling force is far greater than the above-mentioned upward pulling force which is caused in the case of nonattaching the seat belt, as a result of which, as shown in FIG. 2, the upper rail (114) is forcibly moved upwards, with the inwardly and outwardly bent ends (128) (129) of the lower rail (112) being deformed, increasing the possibility of the upper rail (114) being removed out of the lower rail (112). If the upper rail (114) is removed from the lower one (112), it will be inevitable that the occupant will be thrown out forwardly together with the seat into a terrible fatality.

To solve this problem, there are some conventional devices having a great cross-section of upper rail and lower rail, or the upper and lower rails of thick steel plate to reinforce its rigidity in order to avoid deformation of those rails as well as removal of the upper rail. But, these proposals have been found defective in that such great cross section results in unfavorably big dimensions of the device as it takes up a large space, and further increased weight thereof, and such thick rails also lead to the same result.

SUMMARY OF THE INVENTION

It is a purpose of the present invention to provide an improved seat slide device comprising slidably assembled upper and lower rails, which is effectively reinforced its rigidity without need for a large-sized and weight-increased design thereof, and further prevents removal of the upper rail from the lower rail when a great upward force is applied thereto.

In order to achieve the above purpose, in accordance with the present invention, there is provided an anchor plate for a seat belt, within the upper rail, such that the anchor plate is normally biased downwardly but is free to displace vertically. The anchor plate is also provided with a plurality of upwardly directed hook members so arranged in an equidistant manner. The arrangement of upper and lower rails in such that the lower rail encloses the upper rail and has an inverted U-shaped flange formed in its both upper ends, the inverted U-shaped flange being formed with a plurality of engagement holes. When a pulling force is caused by such an acccident as collision and applied to the seat belt, the anchor plate connected to the seat belt is then moved upwardly against the biasing force. Simultaneously with this upward movement, the hook members at the upper rail are brought to engagement into the respective engagement holes at the lower rail.

As a biasing means, there is employed a rubber material, which is interposed between the anchor plate and the upper rail so as to bias the anchor plate in a downward direction.

In another aspect of the invention, the anchor plate is formed of one unitary rigid plate with the foregoing hook members integrally formed therein such that they extend alternately from the lower end of the anchor plate in the opposite directions and are arranged in a longitudinal direction of the anchor plate.

DETAILED DESCRIPTION OF PREFERRED EMBODIMENTS OF THE INVENTION

Figure 1:
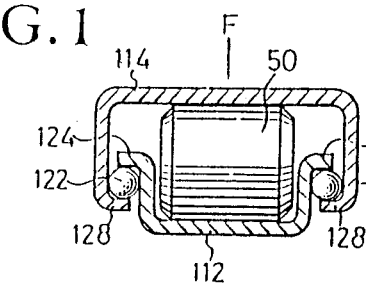
FIG. 1 is a cross-sectional view of a conventional seat slide device in which an upward pulling force (F) is not exerted thereon.
Figure 2:
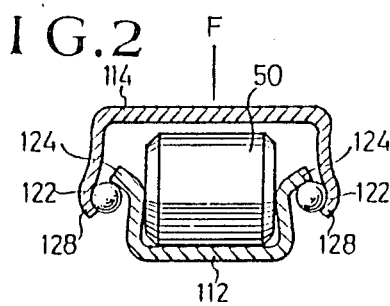
FIG. 2 is a cross-sectional view of the same conventional seat slide device in which the upward pulling force (F) is exerted thereon.
Figure 3:
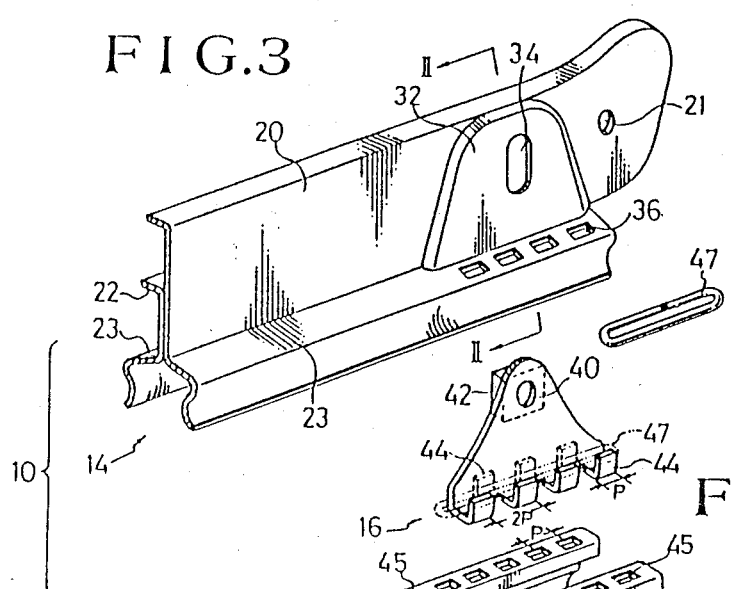
FIG. 3 is an explosive perspective view of a seat slide device in accordance with the present invention.
Figure 4:
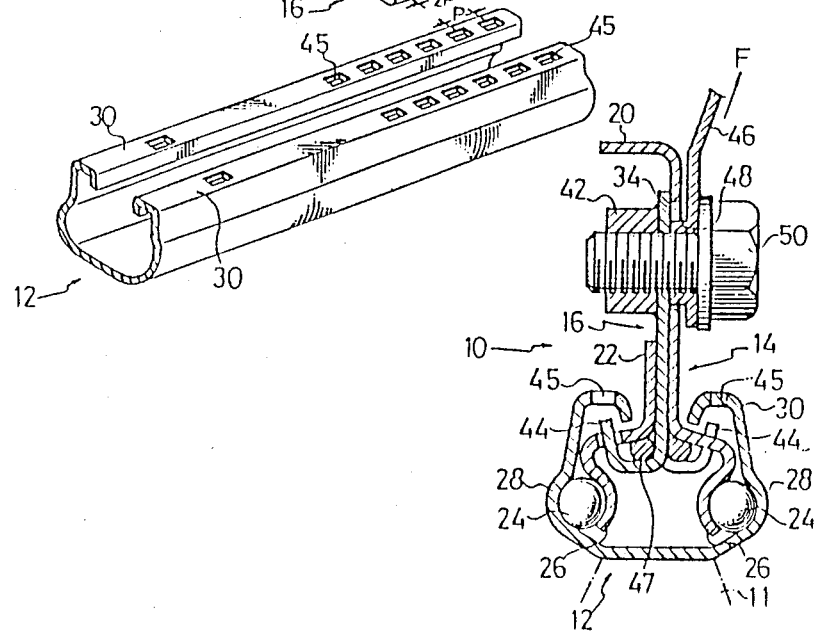
FIG. 4 is a cross-sectional view of the seat slide device taken along the line II—II in the FIG. 3, which shows the state where an upward pulling force (F) is not exerted on the device.

Referring to FIGS. 3 and 4, is illustrative of a seat slide device (10) in accordance with the present invention. The seat slide device (10) comprises a lower rail (12) to be fixed to a floor (11) of an automobile, an upper rail (14) to be fixed to the bottom surface of a seat (not shown), the upper rail (14) being slidably fitted to the lower rail (12), and an anchor plate (16) provided within the upper rail (14).

Figure 5:
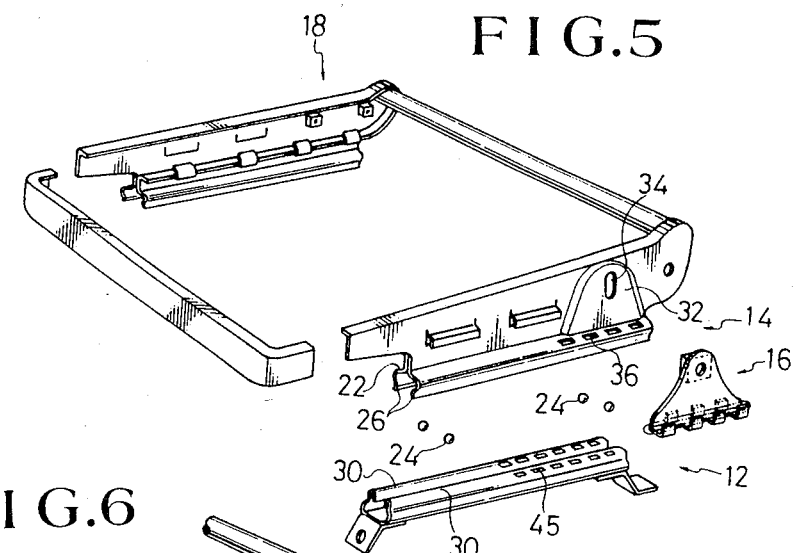
FIG. 5 is an explosive perspective view of a seat slide device in the present invention, in which the device is integrally formed with a seat frame.
Figure 6:
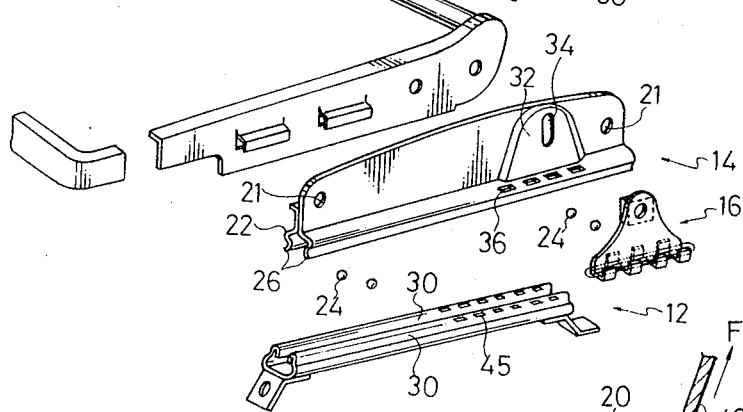
FIG. 6 is an explosive perspecive view of a seat slide device in the present invention, in which the device is formed independently of the a seat frame.

The upper rail (14) may be assembled integrally with a seat frame (18) (See FIG. 5), or assembled independently of the seat frame (18) (See Fig.6).

Hereinafter, description will be given, with a particular reference to such independently formed seat as shown in FIGS. 6.

As illustrated, the upper rail (14) essentially consists of a base plate (20) and an auxiliary plate (22). Both base and auxiliary plates (20)(22) are welded together such that their respective lower portions extend downwardly in a symmetrical distant relation and terminate in inwardly arc-shaped end portions (26). The lower rail (12) is basically formed by bending a unitary steel plate into a substantially U-shaped configuration with an upwardly arc-shaped guide passage (28) formed midway in each of the vertical side walls of thus-formed lower rail (12) and an inverted U-shaped flange (30) integrally formed in each of the upper end potions of the lower rail (12).

The above-described upper and lower rails (14)(12) are assembled together in such a manner that the lower rail (12) encloses the upper rail (14) and steel balls (24) are embraced by both the inwardly arc-shaped end portions (26) of the upper rail (14) and outwardly arc-shaped guide passages (28) of the lower rail (12).

The upper rail (14) is at its base plate (20) fixedly secured to the seat frame (18) by inserting such securing means as a bolt through a hole (21) perforated in the base plate (20).

It is seen that the provision of the steel balls (24) between the upper and lower rails (14)(12) is effective in resisting a transverse force applied to upper and lower rials (14)(12), it may be arranged that at least one roller (not shown) is disposed between the interior of the upper rail (14) and the bottom portion of the lower rail (12). In this way, it is possible to provide both vertical-force and transverse-force resistances in the upper and lower rails (14)(12) so that the upper rail (14) can be smoothly moved slidingly on the lower rail 12) without any vertical and transverse dislocation.

As best seen in FIG. 3, there is formed a raised integral portion (32) at the rearward end portion of the base plate (20), which raised portion (32) is formed by a press working method so as to raisingly project from the flat surface of the base plate, defining a recessed corresponding region in its reverse side, with a vertical elongated hole (34) perforated therein. Further, a plurality of apertures (36) are formed in each of shoulder portions (23) of the base plate (20) and auxiliary plate (22), with the arrangement of the apertures (36) being such that the ones on the side of base plate (20) and the ones on the side of auxiliary plate(22) are mutually offset in a longitudinal direction of the upper rail (14). Preferably, such alternately arranged apertures (36) are spaced apart at an interval equal to plural lock holes (not shown) formed in the lower rail (12), which are so adapted that plural lock pieces (not shown) formed in the upper rail (14) may be inserted through the lock holes.

The anchor plate (16) has a hole (40) formed in its upper end portions and a plurality of hook members (44) so formed that they extend alternately in the opposite directions from the lower end portion of the anchor plate (16). Adjacent to the hole (40), a nut (42) is welded to the anchor plate (16).

The hook members (44) has a pitch (P) indentical to that of the above-mentioned lock hole (not shown) and is so formed as to be engageable into the respective apertures (36). Therefore, as shown in FIG. 3, the amount of total pitch obtained by a pair of oppositely directed hook members (44) is the one designated by (2P).

In this context, such hook members (44) may advantageously be formed from one unitary blank plate when the corresponding portions are cut and bent from the plate, as in FIG. 3. But, by welding an auxiliary plate to the anchor plate (16) and bending the non-welded portions of those two plates in the opposite directions, it is indeed possible to form the hook members (44) after cutting those opposed bent portions accordingly. In this case, a greater number of hook members (44) can advantageously be formed.

In the inverted U-shaped flange (30) of the lower plate (12), there are perforated a plurality of engagement holes (45) each so dimensioned that one of the hook members (44) may be engaged thereinto. In the present embodiment, each of the engagement holes (45) is formed in a rectangular shape, but it may be formed in any other shape that allows the hook member (44) to engage thereinto.

The aforementioned anchor plate (16) is provided in the upper rail (14) in such a manner that the upper portion of the anchor plate (16) is housed in the above-mentioned recessed region defined in the reverse side of the raised portion (32), and the hook members (44) of the anchor plate (16) are inserted through the apertures (36) formed in the shoulder portions (23), with a rubber ring (47) being interposed between the shoulder-portions (23) and the hook members (44). As seen in FIG. 3, prior to assembling together the anchor plate (16) and upper rail (14), the rubber ring (37) is extended around the anchor plate (16) overlying the hook members (44). A clearance is provided not only between the base plate (20) and the anchor plate (16) but also between the auxiliary plate (22) and the anchor plate (16), for the purpose of permitting a smooth vertical movement of the anchor plate (16) in the upper rail (14).

As shown in FIG. 4, to the above-described anchor plate (16), connected is a connecting member (46) of a metallic plate, which is in turn connected to one free end of a seat belt (not shown). The illustrated connecting member (46) is provided with a sleeve (48) having a greater thickness than that of the base plate (20). But, a seat belt may be directly connected to the anchor plate (16) instead of providing such connecting member (46).

The sleeve (48) associated with a seat belt is fitted in the elongated hole (34) of the upper rail (14), and a bolt (50) is inserted through the sleeve (48) and the hole (40) of the anchor plate (16), and threadedly engaged with the nut (42). Due to the engagement of the bolt (50) with the nut (42), the seat belt is securely connected to the anchor plate (16).

As to the sleeve (48), it is of a greater crosssection than that of the elongated hole (34), as shown in FIG. 4, and therefore, there exists a clearance between the surface of the connecting member (46) and that of the base plate (20), so that the sleeve (48) is free to move vertically within the elongated hole (34), which therefore allows the anchor plate (16) to be vertically movable in the upper rail (14).

In normal state, the anchor plate (16) is biased downwardly, as in FIG. 4, by the reason of the rubber ring (47) being interposed between the shoulder portions (23) and hook members (44) and giving its rebounding force as a downward biasing force to the hook members (44) of the anchor plate (16). In this state, the hook members (44) are positioned below the corresponding engagement holes (45) of the inverted U-shaped flanges (30).

In the present embodiment, as a means for biasing downwadly the anchor plate (16), the rubber ring (47) is employed, but in place thereof, a pair of rubber strips may be used, or any other elastic material, such as a plate spring, may of course be used for that purpose. However, it is preferred to employ the rubber material as such biasing means, because the rubber itself has a required biasing force and a good deformable property, without any special modification thereof, and as such, with the rubber material, it is advantageously possible to determine a great range of the upward movement of the anchor plate (16) against the biasing force of the rubber material.

Now, when a great pulling force (F) is exerted vis the seat belt to the above-discussed seat slide device (10) in a sudden accident like a collision, the force (F) is transmitted through the connecting member (46) to the anchor plate (16), tending to raise up the same. At that point, the anchor plate (16) is moved upwardly within the upper rail (14) against the biasing force of the rubber ring (47), and while the the sleeve (48) is in the process of moving up in the elongated hole (34) and the rubber ring (47) is not completely depressed, the upper rail (14) per se is is not caused to move upwardly.

Then, when the rubber ring (47) is completely depressed or the sleeve (48) reaches the upper edge of the elongated hole (34), the upper rail (14) is moved upwardly together with the anchor plate (16).

Figure 7:
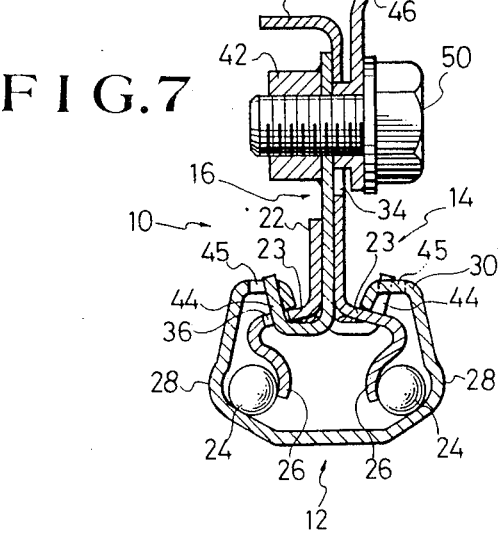
FIG. 7 a cross-section view of the seat slide device taken along the line II—II in the FIG. 3, which shows the state where the upward pulling force (F) is exerted on the device.

At this point, more precisely, the pulling force (F) transmitted from the seat belt tends to raise up the anchor plate (16) in an oblique forward direction. Hence, in actual state, the anchor plate (16) is moved together with the upper rail (14) in a longitudinal direction thereof, with its hook members (44) being in a frictional contact with the inner wall of the inverted U-shaped flanges (30). Immediatelly thereafter, however, the hook members (44) are brought to engagement into the engagement holes (45) of the flanges (30), as illustrated in FIG. 7, and at the same time, the shoulder portions (23) of the upper rail (14) are firmly held between the end edges of the flanges (30) of the lower rail (12) and the hook members (44) of the anchor plate (16). Consequently, the upper rail (14) and anchor plate (16) are unmovably secured to the lower rail (12), with the result that the upper rail (14) is prevented against its vertical and forward movements with respect to the upper rail (12).

In particular, the engagement of the hook members (44) into the holes (45) is so firm that their disengagement will not occur unless the flanges (30) and hook members (44) are extremely deformed or damaged, and therefore has a sufficient resistance against a higher pulling force applied thereto.

Further, it is to be noted that, as the pulling force (F) continues to be exerted on the device (10), causing a further upward movement of both anchor plate (16) and upper rail (14), the shoulder portions (23) of the upper rail (14) is more firmly held between the the end edges of the flanges (30) and the hook members (44) of the anchor plate (16). That is, the greater is exerted the pulling force (F) upon the anchor plate (16), the more firmly held are the shoulder portions (23) of the upper rail (14) between the anchor plate (16) and the lower rail (12), thus offering a sufficient resistance against an increasing pulling force, and preventing a further vertical and horizontal movement of the upper rail (14) in a positive manner, which therefore ensures to prevent the upper rail (14) from being removed out of the lower rail (12).

In addition, such engagement of the hook members (44) with the enagament holes (45) is a simple yet far rigid mechanism effective for overcoming deformation problems. Accordingly, there is no need to design a great cross-section of the upper and lower rails and the present invention can be formed of a thin steel plate. Still further, since the anchor plate (16) is provided within the upper rail (14), there is eliminated the necessity for increasing the area of installation of the seat slide device (10) in the seat. Therefore, the seat slide device (10) per se is of small size and relativelyly reduced weight, with a sufficient rigidity.

While, in the embodiments that have been described before, the seat slide device (10) is provided on both the right and left sides of the seat, it is not always necessary to provide the device (10) in such fasion, and will depend on the particular design of the seat.

The description above has just been given of preferred embodiments of the present invention, but it should be understood that the invention is not limited to the embodiments illustrated but various other replacements, modifications and addtions may structurally be possible without departing from the scope and spirit of the appended claims for the invention.

What is claimed is:

1. A seat slide device comprising:
   a lower rail to be fixed to a floor of an automobile;
   an upper rail to be fixed to a bottom portion of a seat, said upper rail being slidably assembled with said lower rail;
   an anchor plate slidably coupled to said upper rail which is vertically movable relative thereof, said anchor plate being connected to one end of a seat belt;
   means acting on said anchor plate for biasing said anchor plate in a downward direction;
   said anchor plate being provided with a plurality of upwardly directed hooked members which are arranged in an equidistant manner; and
   said lower rail being so formed that it encloses said upper rail and that its upper ends are each formed with an inverted U-shaped flange, and further having a plurality of engagement holes formed in said inverted U-shaped flange,
   whereby, when a pulling force is applied via said seat belt, said anchor plate is moved upwardly against a biasing force of said biasing means, with said hook members being engaged into said engagement holes.

2. The seat slide device according to claim 1, wherein said biasing means comprise an elastic member which is provided between said anchor plate and said upper rail, and biases said anchor plate in a downward direction.

3. The seat slide device according to claim 2, wherein said anchor plate is formed of a unitary rigid plate and wherein said plurality of hook members are formed by cutting and bending the lower end portions of said unitary rigid plate in a longitudinal direction thereof such that thus-bent portions extend alternately from said unitary rigid plate in the opposite directions.

4. The seat slide device according to claim 1, wherein said anchor plate is formed of a unitary rigid plate and wherein said plurality of hook members are formed by cutting and bending the lower end portions of said unitary rigid plate in a longitudinal direction thereof such that thus-bent portions extend alternately from said unitary rigid plate in the opposite directions.

5. The seat slide device according to claim 1, wherein said upper rail includes a plurality of apertures arranged therein in a manner corresponding to said plurality of hook members, and wherein said hook members are inserted through the respective said apertures.

6. The seat slide device according to claim 1, wherein said upper rail comprises a base plate and an auxiliary plate, both of them being welded together, wherein said base plate and said auxiliary plate extend symmetrically relative to each other in their respective lower portions, and wherein in said base plate, formed is an integral raised portion which defines in its reverse side a recessed portion in which said anchor plate is mounted in a vertically movable manner.

7. The seat slide device according to claim 1, wherein aid biasing means comprise a rubber material.

8. The seat slide device according to claim 1, wherein in said upper rail, there is formed a vertical elongated hole, wherein a bolt is inserted through said vertical elongated hole and secured to an upper end portion of said anchor plate, and wherein to said bolt, attached is a connecting member for connecting one end of the seat belt.

* * * * *